United States Patent [19]

Bischoff et al.

[11] Patent Number: 4,571,326

[45] Date of Patent: Feb. 18, 1986

[54] PROCESS AND DEVICE FOR HYDROCONVERSION OF HYDROCARBONS

[75] Inventors: Didier Bischoff; Gérard Courteheuse, both of Rueil Malmaison; Pierre Renard, Saint Nom la Breteche, all of France

[73] Assignee: Institut Francais du Petrole, Rueil-Malmaison, France

[21] Appl. No.: 539,029

[22] Filed: Oct. 4, 1983

[30] Foreign Application Priority Data

Oct. 4, 1982 [FR] France .................. 82 16597

[51] Int. Cl.⁴ .................. B01J 8/08; F28D 21/00
[52] U.S. Cl. .................. 422/207; 261/122; 422/216; 422/220; 422/311
[58] Field of Search .......... 422/143, 199, 220, 311, 422/146, 207, 216, 219; 34/57 A; 432/15, 58; 431/7, 170; 261/122

[56] References Cited

U.S. PATENT DOCUMENTS

| | | | |
|---|---|---|---|
| 2,608,474 | 8/1952 | Gilliam | 422/143 |
| 2,715,565 | 8/1955 | McKay | 432/58 |
| 2,750,681 | 6/1956 | Berry | 34/57 A |
| 2,876,079 | 3/1959 | Upchurch et al. | 34/57 A |
| 3,053,642 | 9/1962 | Huntley et al. | 422/143 |
| 3,458,289 | 7/1969 | King et al. | 422/148 |
| 3,480,265 | 11/1969 | Deve | 432/58 |
| 3,543,414 | 12/1970 | Gomarin | 34/57 A |
| 3,829,983 | 8/1974 | White | 422/143 |
| 4,107,851 | 8/1978 | Takacs et al. | 34/57 A |
| 4,256,174 | 3/1981 | Yoshida | 422/143 |
| 4,271,126 | 6/1981 | Marschollek et al. | 422/143 |
| 4,392,943 | 7/1983 | Euzen et al. | 422/143 X |

FOREIGN PATENT DOCUMENTS

| | | | |
|---|---|---|---|
| 85610 | 8/1983 | European Pat. Off. | 422/143 |
| 2480137 | 10/1981 | France | 422/143 |

Primary Examiner—Barry S. Richman
Assistant Examiner—William R. Johnson
Attorney, Agent, or Firm—Millen & White

[57] ABSTRACT

The hydrotreatment of hydrocarbons in the liquid phase is effected in a column containing a catalyst fixed or moving bed supported by a grid, wherethrough passes an ascending stream of the charge admixed with hydrogen. The perforations of the grid are small enough to prevent passage of the catalyst particles but large enough for giving passage to the hydrogen-charge mixture. The reaction effluent is withdrawn from the top of the column.

4 Claims, 18 Drawing Figures

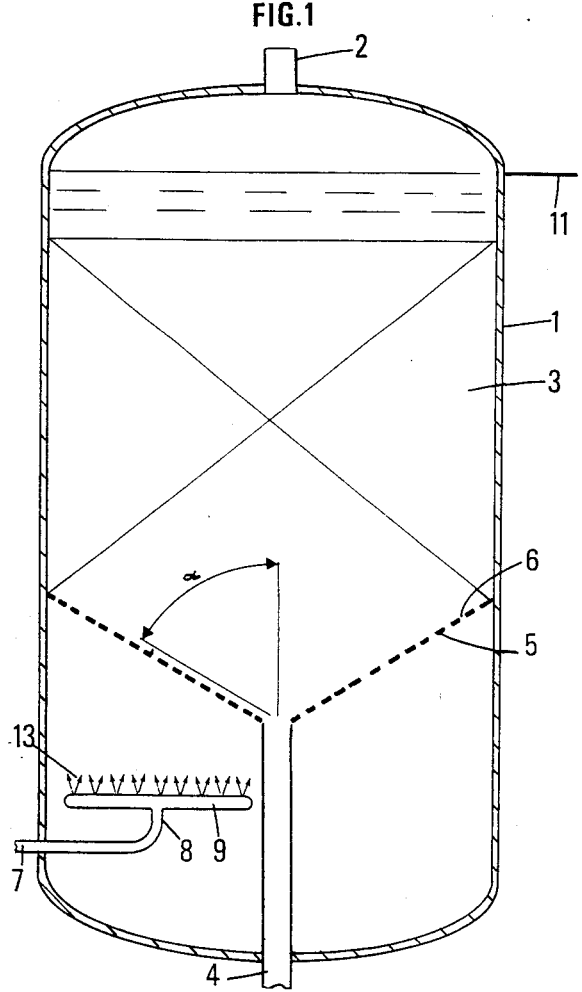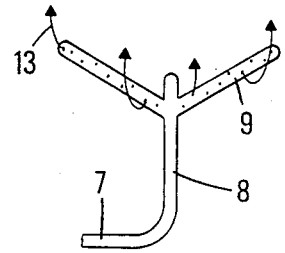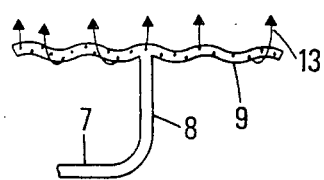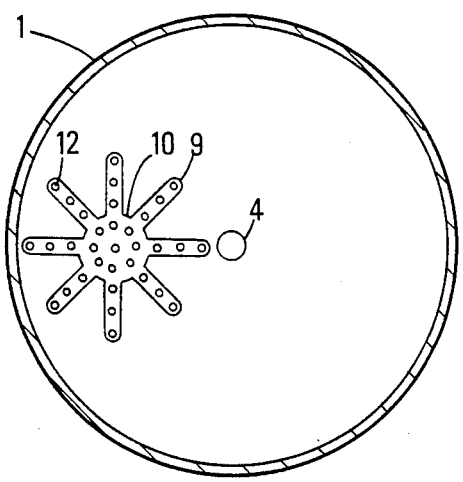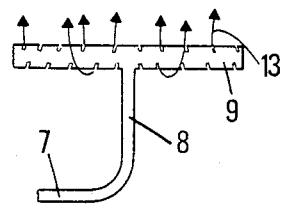

3 4,571,326

PROCESS AND DEVICE FOR HYDROCONVERSION OF HYDROCARBONS

BACKGROUND OF THE INVENTION

This invention concerns a process and devices for catalytic treatment (or hydrotreatment) of a fluid charge, and more particularly, for the demetallation, desulfurization, hydrotreatment and conversion or hydroconversion of hydrocarbons, in fixed or moving bed as explained hereafter.

The invention is particularly applicable to the catalytic treatments of liquid charges such as, for example, distillates obtained from heavy crude oils, residues of straight run and vacuum distillation of hydrocarbons, these treatments being generally effected in the presence of hydrogen and/or gaseous mixtures of high hydrogen content, over a bed of solid catalyst, with the catalyst being used as particles (extrudates, grains of various shapes, balls, etc . . . ).

During such catalytic treatments, often a quick deactivation of the catalyst is observed, which is due to the presence of catalytic poisons, the coke formation, the deposit of certain metals . . . , etc . . . .

This deactivation frequently requires the replacement of the whole or a part of the catalyst bed.

SUMMARY OF THE INVENTION

In the process of the invention, the catalyst withdrawal from the reactor is effected progressively. By "progressively" it is meant that the catalyst is withdrawn:

either periodically, for example, at a frequency from 1/10 to 10 days, by withdrawing at each step only a fraction of for example 0.5 to 15% of the total catalyst amount. It is also possible, according to the needs, to withdraw a larger amount of catalyst and for example, up to 100% of the total catalyst amount, i.e. the entire catalyst amount.

The frequency of the catalyst withdrawal may be much higher (every minute or every second, for example), the withdrawn amount being proportionally reduced.

or, in a continuous manner.

The fresh catalyst is introduced at the upper part of the reactor; the system for injecting together the charge and hydrogen as a mixed fluid flowing upwardly in the reactor, is the object of the present invention.

The process of the invention and the devices according to the invention are thus convenient for injecting a charge and for withdrawing catalyst particles from reactors used for cracking, hydrocracking, hydroforming, manufacturing of aromatic hydrocarbons, isomerizing paraffinic, naphthenic or aromatic hydrocarbons, for various reactions of hydrogenation, hydrotreatment, dehydrogenation, alkylation, transalkylation, hydrodecyclization, hydrodealkylation, hydrovisbreaking treatments etc . . . reactors wherein the injected charge and/or gases flow upwardly.

The fluid charge, which generally is a mixture of a liquid and a gas, is introduced into the reactor or enclosure containing catalyst particles through distribution means located at the lower part of the reactor or of the enclosure and flows upwardly countercurrently with the catalyst (upflow) before being discharged, after treatment, at the upper part of the reactor, (or of the enclosure which is arbitrarily called "reactor" hereinafter in the specification). The catalyst flow, by gravity, provides for a steady downward motion of the catalyst bed, whereas the ascending flow of the fluid charge provides in particular for an easy adjustment of the residence time and results in a controlled unpacking of the bed.

Besides, the countercurrent circulation of the charge and the catalyst provides for a high catalytic conversion since the fresh catalyst introduced at the top of the reactor treats an almost converted charge (i.e. containing essentially compounds whose conversion is difficult), whereas at the bottom of the reactor, the used or exhausted catalyst treats a fresh charge (i.e. containing a high proportion of compounds easy to convert), which increases the efficiency of the first steps of the conversion. It results in a systematic use of the catalyst capacity in the reactor, a more regular thermal distribution in the catalyst bed than with the circulation of the co-current type, with, in particular, at the bottom of the reactor, a more moderate temperature thus reducing the likelihood of coking of the catalyst.

A catalytic conversion process with moving bed is known from the, U.S. Pat. No. 3,826,737. This process is however more particularly adapted to the co-current circulation of the catalyst and the liquid charge, the latter being discharged at the bottom of the reactor through a cylindrical grid placed at the base of a catalyst discharge cone which holds the catalyst bed.

Such a process suffers from the disadvantage of a likelihood of clogging the grid by the catalyst grains pressed against said grid by the liquid charge discharged from the bottom of the reactor. This may then result in an irregular distribution of the fluids through the catalyst, in a difficult flow of the catalyst bed, with likelihood of clogging of certain zones of said bed, as well as in an increase of the catalyst attrition resulting from the friction between the blocked grains and the free grains of the catalyst bed, and between the free catalyst grains and the discharge grid for the liquid charge. The object of the invention is to provide a technique which avoids the above-mentioned disadvantages.

This technique consists of injecting the liquid and the gases below the wall which holds the catalyst bed, through a plurality of orifices distributed over the section of the reactor, in conformity with the various arrangements which are the object of the invention.

More particularly, this result is obtained by a process, (with progressive withdrawal of the powdered solid particles in a generally confined space), for introducing in said space a fluid charge consisting of a liquid and a gas (generally hydrogen). The generally confined space has substantially the shape of an elongate revolution volume which is substantially vertical. The solid particles are introduced at the upper part of the enclosure and progressively withdrawn from the lower part of the enclosure after having progressed downwardly through said enclosure. The fluid charge is introduced at least partly and generally continuously at the lower part of said enclosure and is withdrawn from the upper part after having progressed upwardly through said enclosure. The process provides that the solid particles are progressively withdrawn from the lower end of at least one flared zone having a shape depending on the geometry of the reactor and, generally, the shape of an inverted cone or an inverted pyramid, i.e. a cone or a pyramid whose apex is turned downwardly, apex through which is pierced an opening of convenient size for the discharge of the solid particles. The wall of the flared zone is being substantially and regularly discontinuous, i.e. provided with at least several regularly spaced openings having each a sufficiently small size to prevent the solid particles from passing through the wall, but sufficiently large to provide passage through the openings to an ascending flow of the fluid charge. The process is characterized in that the fluid charge is injected in the lower portion of the enclosure through at least one distribution zone to particular shape, specific of the invention, and located below the wall. By way of example, a first type of distribution zone generally consists of a main duct or pipe which, for example, is substantially horizontal or vertical when penetrating inside the reactor. The duct optionally forms at least one bend, its end part then becoming substantially vertical below the wall of the flared zone which holds the catalyst bed. The end part is then subdivided into a plurality of branches (or beams) arranged (toric distribution type and tube network), for example, in star-like configuration, (with at least three branches or beams), each branch being provided with several orifices judiciously arranged, (facing the wall or located at the opposite side or on the sides of the branch), all along the branch, and through which the mixed fluid is injected so as to reach uniformly the catalyst bed, i.e. so as to homogeneously irrigate it.

BRIEF DESCRIPTION OF THE DRAWING

The invention is first illustrated by the various FIGS. 1 to 4.

FIGS. 1 and 1A show, in axial cross-section and in transverse cross-section respectively a first device according to the invention with, in this case, at least one distributor of so-called star-like shape.

FIGS. 2 to 4 illustrate various other embodiments of the means for introducing the fluid charge in order to also obtain a better gas-liquid dispersion.

FIG. 1 shows diagrammatically a first embodiment of a catalytic treatment device, for example, with a fixed bed or a moving bed.

Figure 5:
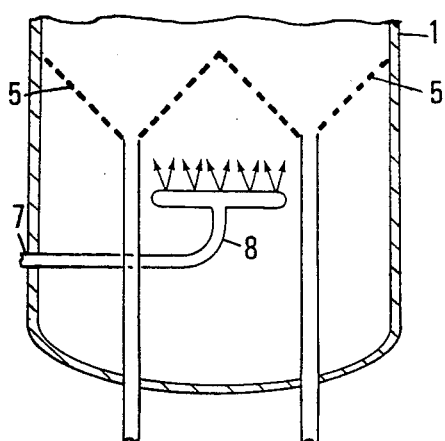
FIGS. 5 and 5A diagramatically illustrate, respectively in axial cross-section and in traverse cross-section, an embodiment of the invention wherein discharge is effected through several withdrawing funnels at the bottom portion.

Reactor 1, which may be of the radial or axial type, comprises at its upper part means for progressively introducing fresh catalyst (new or regenerated) diagrammatically shown as line 2 which supplies the catalyst particles to feed a fixed or moving catalyst bed 3.

The catalyst flows by gravity through the reactor and is progressively discharged through line 4, at the lower part of reactor 1, through a withdrawing funnel 5 which, in the figure, is formed of a grid. This funnel, having in this occurrence the shape of an inverted cone, is hence provided with openings such as 6, formed by the perforations of the grid 5 which give passage to at least the liquid and gaseous charge injected below the level of the grid of funnel 5 through a line such as 7, but do not give passage to the catalyst particles.

The angle $\alpha$ formed by the cone axis (or the pyramid axis when the funnel has a pyramidal shape) with one of the cone generatrices (or one of the pyramid edges) is generally comprised between 10° and 80°, preferably between 20° and 50°.

The fluid charge, formed of two phases (liquid and gas), is thus introduced at the lower part of reactor 1 through at least one distribution zone comprising a distribution ramp 7 (horizontal, oblique or vertical or arranged in any adequate manner, for example, vertically in certain industrial reactors) which feeds at least one vertical injection pipe 8 with radially extending tubes (or branches) 9 in star-like arrangement as shown in FIG. 1A, which is a transverse cross-section of reactor 1.

In FIG. 1A, each branch 9 of the star 10 is provided with orifices 12 (holes or slots or other perforations of the same type) for injecting the fluid charge inside the reaction zone.

The fluid charge, formed of two phases (liquid and gas) flows upwardly through the reactor in counter-current with the catalyst before being discharged at the upper part of the reactor through collecting and discharging means diagrammatically shown as line 11, having the shape, for example, of a rake formed of collecting tubes connected to a discharge duct.

In the case of the FIG. 1, where the distributor (or distributors) shown in the figure as the assembly of elements 7, 8 and 9, has the shape of a star substantially horizontal; the various orifices such as 12 (see FIG. 1A) of the various branches 9 are judiciously calibrated and distributed (below, above and on the sides so as to provide for the better distribution of the gas and the liquid over a wide range of flow rates).

In FIGS. 2, 3 and 4, is shown a horizontal ramp 7, with at least one vertical end part (or pipe) 8 and branches 9 of various shapes. These branches, (whose inclination may for example be from 0° to 60° to a horizontal line), have either the shape of a star with inclined branches as in FIG. 2, (or shaped as the ribs of an overturned umbrella), or of a star with branches of undulated shape as in FIG. 3. FIG. 4 shows the possible positions of orifices such as 12 on a branch 9 in order to inject in multiple directions (diagrammatically shown by arrows 13 in FIGS. 1, 1A, 2, 3 and 4) the fluid droplets so as to make them penetrate inside the catalyst mass in homogeneous manner at any point of the surface of the grid or wall 5, through the openings 6 in FIG. 1.

The stars of the distributors may comprise 3, 4, 5, 6, 7, 8, etc . . . or more branches or radial extensions.

Figure 5A:
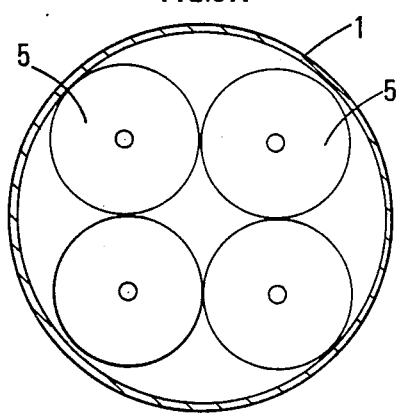

FIGS. 5 and 5A diagrammatically illustrate an embodiment wherein the discharge of the catalyst is effected through several withdrawing funnels. FIGS. 5 and 5A show only the bottom of a reactor 1 and the funnels such as 5 and FIG. 5A shows a single pipe and a single ramp 7. The cross-sectional view of FIG. 5A thus shows 4 funnels, only two of which can be seen in FIG. 5, in axial cross-section.

The number of withdrawing funnels 4 depends on the geometry of the reactor, on the mechanical construction requirements, and on the desired uniformity of the paths of the catalytic particles through the various sectors of the reactor.

Such a withdrawing mode makes it easy to adjust the flow rate of the catalyst, independently of that of the fluid charge, and makes it possible to obtain at will (in moving bed) a continuous withdrawal or a discontinuous (periodical) withdrawal of the catalyst.

Another improvement of the process is characterized as follows: the mixed fluid injected through a distribution zone (star-shaped or not) flows in the direction of a funnel or funnels which hold the catalyst bed while first passing, before reaching said funnels, through a space (18) (FIG. 6) whose upper part is provided with orifices sufficiently large to give passage to the major part of the gaseous phase of the mixed fluid, but sufficiently small to prevent the passage of the major part of the liquid phase of the mixed fluid, said space being traversed by vertical walls which define openings through said space, so that the mixed fluid inside said space is subdivided into, on the one hand a gaseous phase, and on the other hand a liquid phase, the major part of the gaseous phase reaching a funnel through said orifices of said upper part of the space, the major part of the liquid phase reaching a funnel after having progressed through said openings defined by said vertical walls traversing said space, and after having been again admixed (above said orifices of said upper part of the space) with the major part of the gaseous phase in order to create homogeneous and regular contact at all the levels of the catalyst bed and to ensure a better dispersion of the gas and the liquid over a wide range of flow rates.

This improvement of the apparatus thus makes it possible to obtain a still more regular dispersion of the fluid through the catalyst bed over a wide range of flow rates. This improvement, illustrated in FIG. 6, consists of providing, in the reactor 1, between the grid 5 which holds the catalyst bed (catalyst withdrawal through line 4) and the ramps such as 7, distribution zones either star-shaped or not (diagrammatically shown as discs 8 ), an additional grid 14 (or any other equivalent means), whose perforations 20 are sufficiently small for preventing the passage of the major part of the liquid phase of the fluid (introduced through the distribution zones 8) while giving passage to the major part of the gaseous phase of the fluid. Continuous walls or barriers 15, (i.e. unperforated or solid) substantially vertical, in the form of conduits for example, are arranged, generally regularly below said grid 14 by taking their bearing or supported on said grid 14 (and their lower ends are located sufficiently low in the reactor, generally at a level above that of the distribution zone 8) and thus define a compartment 18 and conduits or, hereinafter, 19: the gaseous fraction of the fluid reaches in major part (arrows 17) the grid 5 through the compartment 18 and orifices 20, after having traversed zones 22 of accumulation and separation of a liquid phase and a gaseous phase. Plates or baffles 21 are arranged below the lower ends of conduits 19 (and above the level of the distribution boxes) so that the mixed fluid injected through the distribution zones 8 whose path is identified by arrows 13, accumulates in compartments 18, the major part of the liquid rushing through the conduits 19 (path shown by arrows 16). The above-described improvement thus acts as a mixer and provides for the dispersion of the fluid charge.

Figure 6:
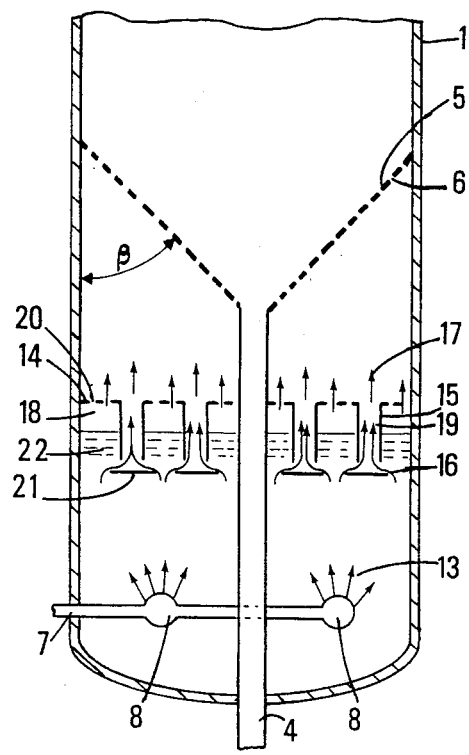
FIG. 6 illustrates another embodiment wherein a distribution zone is provided between the catalyst grid and the distributor.
Figure 7:
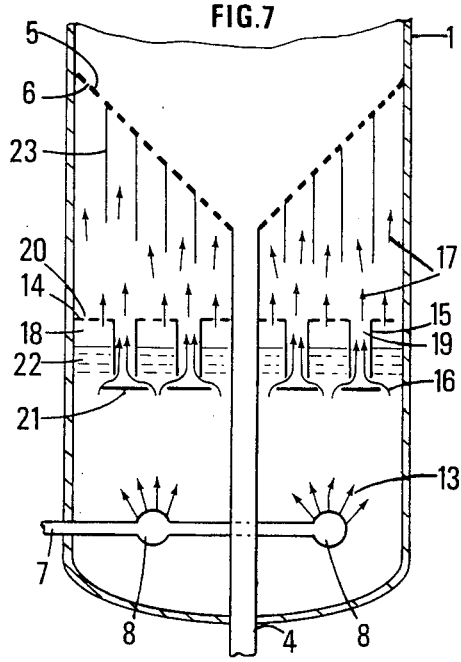
FIG. 7 illustrates one embodiment wherein a plurality of zones are provided for improving distribution of both gas and liquid phases over the entire bed section of the reactor.
Figure 7B:
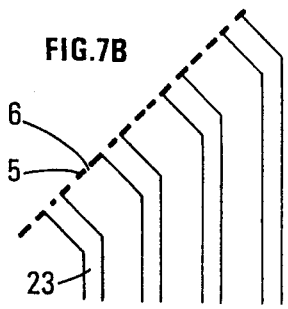
FIGS. 7A and 7B respectively show alternative embodiments of elements making up the zones of FIG. 7.
Figure 7A:
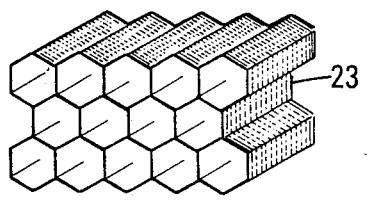

The devices of FIG. 6 may be further improved. As a matter of fact, it has been observed that the gases, whose path is shown by arrows 17, tend to be directed towards and to accumulate into angles $\beta$ defined by the walls of the funnel or funnels 5 and the wall of reactor 1. In order to avoid the migration of the gas below the upper part of the funnel and thus to improve the distribution of the gas and the liquid over the whole section of the bed, the gaseous phase (supplied from orifices at the upper part of said spaces) is caused to pass through a plurality of elongate zones, non-communicating parallel and substantially vertical or oblique or partly vertical and oblique, which thus oblige the gas particles to follow a controlled path below the funnel or funnels. FIG. 7 illustrates this embodiment: the same attachements as in FIG. 6 are present and, in addition, a plurality of elongate vertical zones, separated by vertical barriers 23 are shown. On the right side of FIG. 7, the lower ends of these barriers are all at the same level; these ends are at different levels on the left side of FIG. 7. The length of the barriers and their level depend essentially on the geometry of the distribution zones. FIG. 7A shows, by way of non limitative example, an embodiment of these barriers 23 forming in this case chambers or tubes of the cellular type or of honey-comb shape. The upper part of these tubes is placed at the immediate vicinity of the grid-funnel 5 and preferably in contact with said grid-funnel. FIG. 7B illustrates barrier 23 which are vertical at their lower part and oblique at the vicinity of grid 5 which holds the catalyst.

Figure 8:
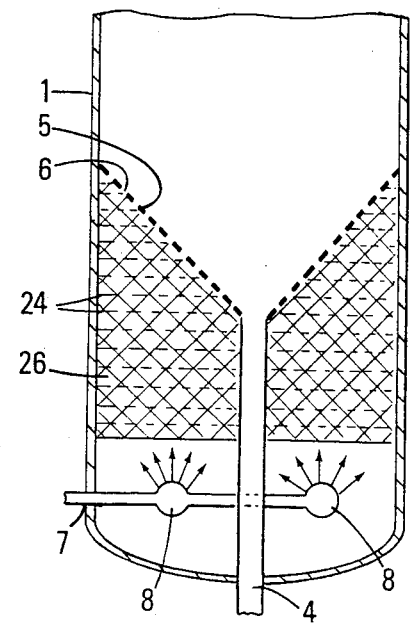
FIGS. 8 and 9 show alternative constructions of the device constructed for operating as a mixer.
Figure 9:
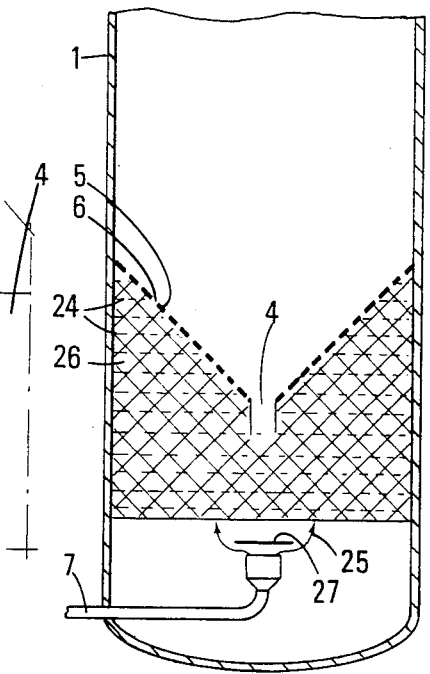

Another improvement of the process and of the apparatus conforming with the invention and also acting as mixer for the fluid charge, is illustrated in FIG. 8 or FIG. 9 (in FIG. 9, line 4 for the catalyst withdrawal is not shown). This process consists of passing the mixed fluid, injecting through a distribution zone either star-shaped or not, through a plurality of cellular layers, juxtaposed to one another and placed between the one or more distribution zones and the one or more funnels which hold the catalyst bed, in order to produce a regular and homogeneous distribution of the charge in the catalyst bed and to provide for better dispersion of the gas and the liquid over a wide range of flow rates.

Figure 8A:
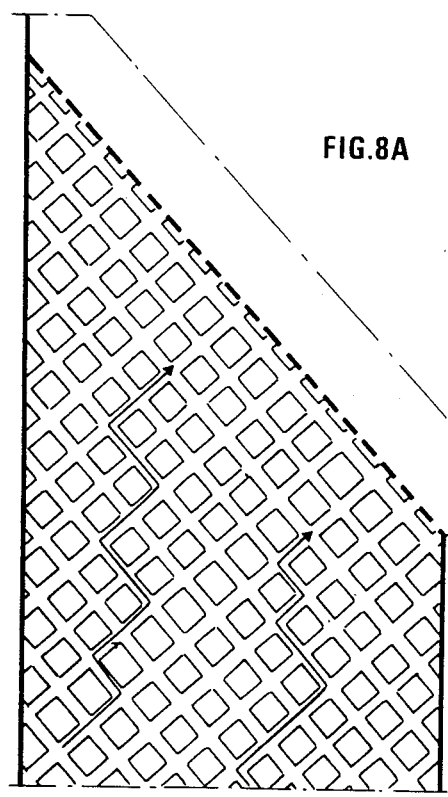
FIGS. 8A and 9A are enlarged views of the paths defined by elements making up the mixing sections of the device of FIGS. 8 and 9, respectively.

With reference to FIG. 8 or 9, the injected fluid is passed through the reactor 1, in the direction of the grid 5 and its perforations 6, through the distribution system 7 and 8, star-shaped or not (and for example, in FIG. 9, formed as a "jet-breaker", i.e. an injection duct with a plurality of orifices overtopped by at least one plate 27 which breaks the jet to rain, as indicated by arrows 25) through the cells of a kind of waffle-iron 26, itself formed of a series of elements 24 shaped as plates or cellular layers of various shapes (cylindrical or square etc . . . for example) depending on the geometry of the reactor and pressed against one another. Generally, each element has the shape of a rough or ribbed or corrugated plate having ribs (as shown in FIG. 10) and the plates, identical or different, are so arranged as to provide for continuous complex paths (illustrated in FIGS. 8A and 9A) from the lower part to the upper part, wherethrough the mixed fluid may be conveyed to the upper part through a multitude of orifices and may thus reach the catalyst bed regularly over its whole section, through the grid-funnel 5.

Figure 9A:
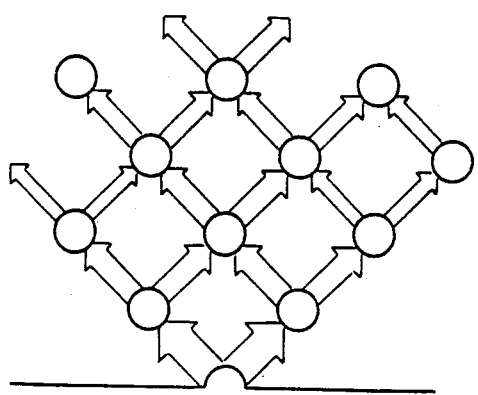

In each element or plate, as shown in FIG. 9A, each fluid path is subdivided in turn in other fluid paths.

Figure 10:
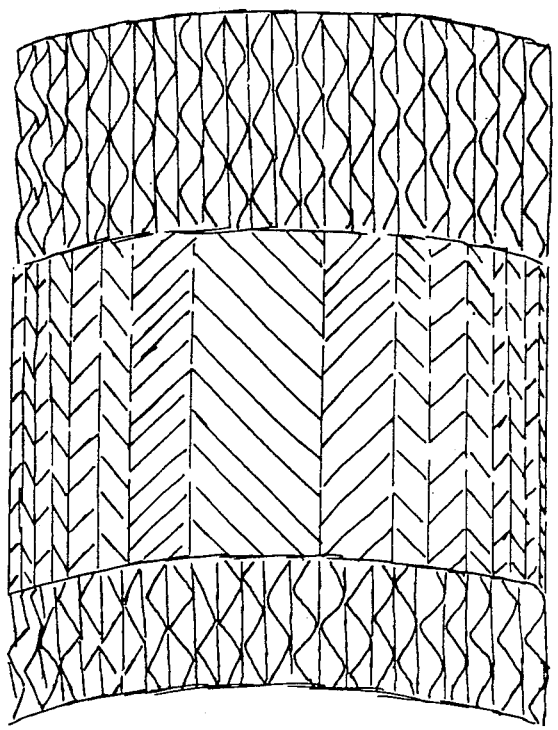
FIG. 10 is a view of the mixing plates employed to define the mixing paths.

The plates, whose general aspect is shown in FIG. 10, are manufactured in a metal or alloy or an adequate plastic material. They are presently commercially available in the trade and are known as "Sulzer Plates".

Figure 11:
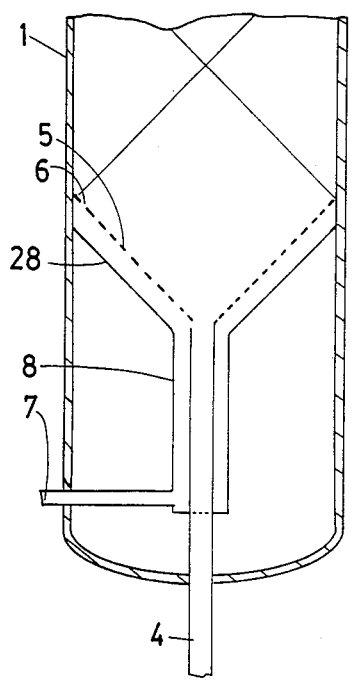
FIGS. 11 and 12 show still other embodiments of the device of the invention.

Another improvement of the process and apparatus according to the invention consists of making use of at least one distribution zone consisting of (a) any pipe, for example, vertical or horizontal wherethrough is fed the mixed fluid and (b) an enclosure located below the flared zone, the lower part of said enclosure having the shape of an elongate vertical chamber of substantially the same axis as that of said flared zone, the upper part of said enclosure being shaped as a flared zone extending below the whole of said flared zone and parallel thereto, thus forming an envelope around said funnel. FIG. 11 illustrates an embodiment of distribution box of this type. Everything works as if the fluid were introduced into the reactor I through a kind of double wall integral with the grid-funnel. The charge is introduced through a conventional ramp 7 (which can be positioned in any adequate member, horizontal or vertical, in most cases in certain industrial reactors); the vertical duct is a pipe 8 of the same axis as that of the grid-funnel 5, this pipe being enlarged at its upper part so as to form a second funnel 28 near the perforated funnel 5 and below this funnel 5.

Turbulence internal promoters, not shown in the figure, allow the charge to reach the whole section of the catalyst bed through the perforated wall 5 and to obtain a good dispersion of the liquid and of the gas at the inlet of the catalyst bed.

Figure 12:
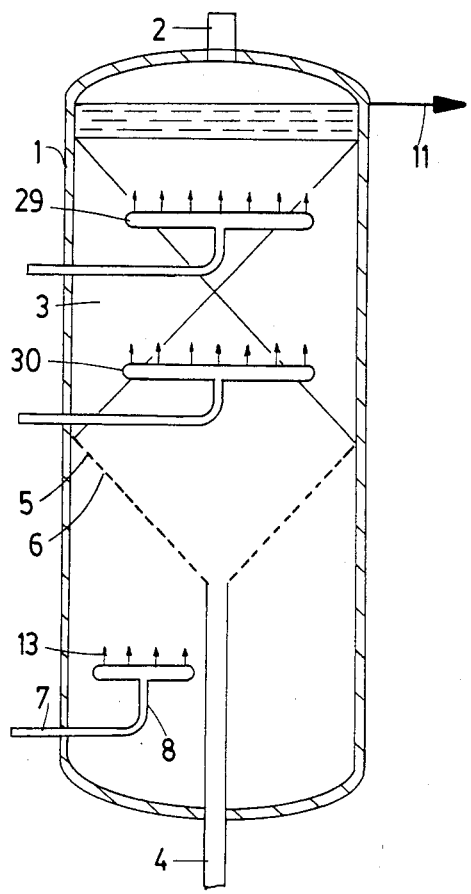

In the process and with the apparatuses conforming to the invention as above described, it is also possible, in order to control the exothermicity of the reaction in the catalyst bed, to effect quenches, generally with cold hydrogen and/or with a judiciously selected liquid, for example, a liquid of the same nature as the charge, for example at the inlet or the outlet of the reaction zone or still between the catalyst beds (since the processes and apparatuses above described are also applicable in the case of superposed catalyst beds), but also in the middle of one or of the catalyst bed itself and, in the latter case, it appears desirable to inject the fluid used to make such a quench, (e.g. cold hydrogen or cold liquid), by means of at least one star-shaped distribution zone of the type precedingly described with reference to FIGS. 1 to 4 or a distribution zone having the shape of lozenges or cylinders judiciously spaced so as to increase the turbulence and hence the efficiency of the quench between these lozenge-shaped or cylindrical distributors. Any other shape which does not impede the catalyst motion may also be used. FIG. 12 where is shown a star-shaped box (7 and 8) for injecting the charge (arrow 13) through a funnel-grid 5 in the bed 3, thus comprises two star-shaped boxes 29 and 30 for effecting quenches. The effluent is withdrawn through line 11.

What is claimed is:

1. An apparatus for conducting a process for withdrawing solid particles and introducing a fluid charge at the lower portion of a contact zone, comprising a reactor, first introducing means for introducing fresh catalyst at the upper part of the reactor, first discharge means for discharging used catalyst at the lower part of said reactor, with said first discharge means comprising at least one withdrawing funnel of inverted conical pyramidal shape, whose apex is turned downwardly, with the apex further defining an opening for discharging used catalyst from the reactor, wherein said at least one withdrawing funnel is provided with perforations or slots substantially distributed over its entire surface, with the size of said perofrations being sufficiently small to prevent passage of catalyst particles introduced into the reactor through said perforations, but sufficiently large to permit passage of an ascending stream of fluid charge;

second introducing means for introducing a fluid at the lower part of the reactor and second discharge means for discharging a treated fluid charge at the upper part of the reactor; and distribution means arranged between the funnel and the fluid second introducing means, said distribution means comprising ($\alpha$) grid means having perforations which are sufficiently small to prevent the passage of the major part of a liquid phase of fluid introduced and permitting only passage of the major part of a gaseous phase of fluid introduced; ($\beta$) a plurality of continuous and substantially vertical walls or barriers defining a plurality of conduits extending downwardly from said grid means and having their lower ends arranged in the reactor at a level generally higher than that of the second fluid introducing means (7) and (8), said barriers or walls thus defining compartments below said grid means and surrounding said conduits; and ($\gamma$) plates or baffles (21) arranged below the lower ends of the conduits for ensuring accumulation of introduced fluid in said compartments.

2. An apparatus accoring to claim 1, further comprising quench means located above the at least one funnel for conduting quenching of reactions in said in said reactor, said quench means comprising a tube penetrating into the reactor, with an end of said tube extending substantially vertical and further including a plurality of branches extending from said end in a sar arrangement, each branch being provided with perforations or slots distributed over the length of the branch.

3. An apparatus according to claim 1, further comprising a plurality of parallel, non-communicating elongate members extending between said grid means and said at least one withdrawing funnel for preventing gas flow migration and improving distribution of gas and liquid throughout the reactor.

4. An apparatus according to claim 3, further comprising a quench means located above the at least one funnel for conduting quenching of reactions in said in said reactor, said quench means comprising a tube penetrating into the reactor, with an end of said tube extending substantially vertical and further including a plurality of branches extending from said end in a star arrangement, each branch being provided with perforations or slots distributed over the length of the branch.

* * * * *